United States Patent
Bryson et al.

(10) Patent No.: US 10,868,931 B2
(45) Date of Patent: Dec. 15, 2020

(54) BIAS MEMBERS

(71) Applicant: Hewlett-Packard Development Company, L.P., Houston, TX (US)

(72) Inventors: John Andrew Bryson, Vancouver, WA (US); Justin M. Roman, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/098,120

(22) PCT Filed: Jun. 30, 2016

(86) PCT No.: PCT/US2016/040344
§ 371 (c)(1),
(2) Date: Oct. 31, 2018

(87) PCT Pub. No.: WO2018/004591
PCT Pub. Date: Jan. 4, 2018

(65) Prior Publication Data
US 2019/0149678 A1    May 16, 2019

(51) Int. Cl.
*G06K 15/00* (2006.01)
*H04N 1/00* (2006.01)
*H04N 1/04* (2006.01)

(52) U.S. Cl.
CPC ....... *H04N 1/00588* (2013.01); *H04N 1/0066* (2013.01); *H04N 1/00602* (2013.01); *H04N 1/04* (2013.01)

(58) Field of Classification Search
CPC .......... H04N 1/00588; H04N 1/00594; H04N 1/00602; H04N 1/00607; H04N 1/0066; H04N 1/04
See application file for complete search history.

(56) References Cited

U.S. PATENT DOCUMENTS

| | | | |
|---|---|---|---|
| 6,942,406 B2 | 9/2005 | Sunada et al. | |
| 7,269,367 B2 | 9/2007 | Kwon et al. | |
| 7,580,165 B2 | 8/2009 | Liu et al. | |
| 7,715,064 B2 | 5/2010 | Yoshida et al. | |
| 8,646,864 B2 | 2/2014 | Rosati et al. | |

(Continued)

FOREIGN PATENT DOCUMENTS

| | | |
|---|---|---|
| CN | 1854940 A | 11/2006 |
| CN | 201114344 Y | 9/2008 |

OTHER PUBLICATIONS

Evernote Corporation, Scanning Documents of Difference Widths or Lengths in One Batch, ScanSnap Evernote Edition Scanner Help, Feb. 17, 2016, 3 pages.

(Continued)

*Primary Examiner* — Moustapha Diaby
(74) *Attorney, Agent, or Firm* — HP Inc. Patent Department

(57) ABSTRACT

In an example, a scanning system includes a scanner device, a first bias member, and a second bias member. The example first bias member is able to apply pressure on a medium towards a scan surface of the scanner device (e.g., apply pressure at a scan zone defined by the boundaries of the scanner device) and the example second bias member is able to orient the medium towards the scan surface before the medium reaches the first bias member.

19 Claims, 3 Drawing Sheets

(56) References Cited

U.S. PATENT DOCUMENTS

| | | | |
|---|---|---|---|
| 2004/0218230 A1* | 11/2004 | Furihata | G03G 15/60 358/474 |
| 2006/0132863 A1* | 6/2006 | Yoshida | H04N 1/00602 358/474 |
| 2009/0051975 A1 | 2/2009 | Wiens et al. | |
| 2011/0129278 A1 | 6/2011 | Muir et al. | |
| 2013/0003139 A1* | 1/2013 | Osakabe | H04N 1/2032 358/465 |

OTHER PUBLICATIONS

Fujitsu Computer Products of America, fi-4990C Production Color Document Scanner, imaging, Sep. 2, 2005, 2 pages.

* cited by examiner

BIAS MEMBERS

BACKGROUND

An imaging device may utilize a print medium for performing imaging operations and may include media handling components to assist the medium along a media path of the imaging device. An imaging device may include a component for printing or scanning, for example.

DETAILED DESCRIPTION

Figure 1:
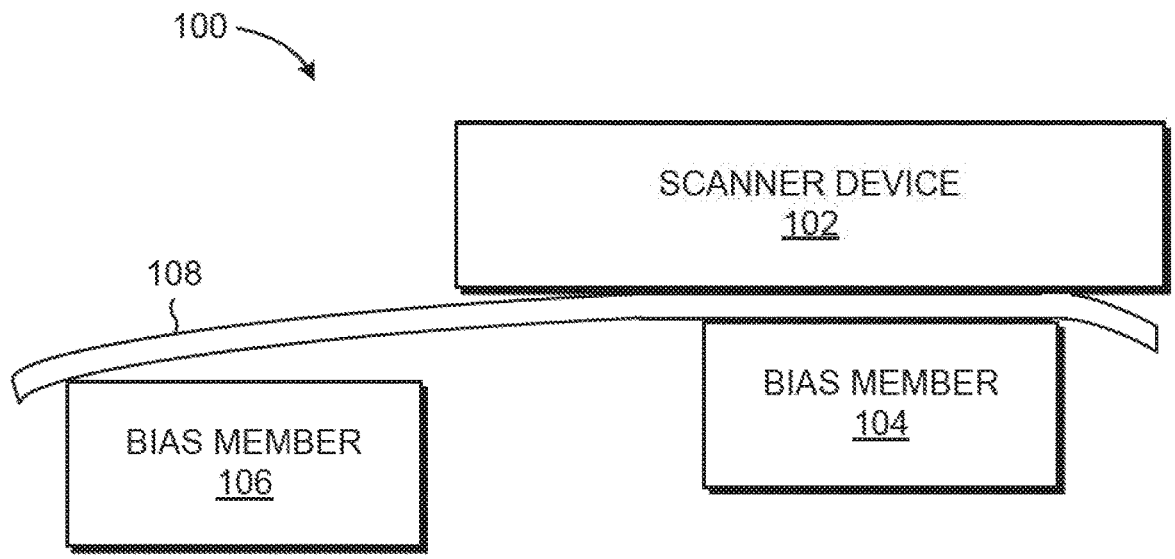
FIGS. 1 and 2 are block diagrams depicting example scanning systems.

In the following description and figures, some example implementations of imaging apparatus and scanning systems are described. An imaging device may be any apparatus capable of performing an imaging operation, such as a printing device performing a printing operation or a scanner performing a scanning operation (e.g., an image digitization operation). In the examples describe herein, the imaging devices include components to perform a scanning operation, such as a scanner device capable of digitally copying an imaging from a target medium. For example, the imaging device may be a multifunctional printing device with components capable of performing multiple imaging operations, including printing operations and scanning operations.

In examples described herein, a "printing device" may be a device to print content on a physical medium (e.g., paper or a layer of powder-based build material, etc.) with a print fluid (e.g., a fluid comprising ink or toner). For example, the printing device may be a wide-format printing device that prints latex-based print fluid on a print medium, such as a print medium that is size A2 or larger. In the case of printing on a layer of powder-based build material, the printing device may utilize the deposition of print fluids in a layer-wise additive manufacturing process. A printing device may utilize suitable printing consumables, such as ink, toner, fluids or powders, or other raw materials for printing. In some examples, a printing device may be a three-dimensional (3D) printing device. An example of print fluid is a water-based latex ink ejectable from a print head, such as a piezoelectric print head or a thermal inkjet print head. Other examples of print fluid may include dye-based color inks, pigment-based inks, water-based inks, latex inks, solvents, gloss enhancers, and the like. Examples of a print medium include paper, cardstock, corrugated cardboard, photo paper, envelopes, film, transparencies, plastic laminate, vinyl, canvas, textiles, or other like materials capable of retaining a print fluid.

Various examples described below relate to providing a bias member outside of the scan zone to provide a force on a medium before reaching the scanner device. By orienting the medium towards the scanning surface of the scanner device before arriving at the scanner device, an image have, for example, a greater likelihood of being captured with accuracy. This may help, for example, when stitching together overlapping portions of scans of multiple scanner devices for scanning operations performed on large media, such as A2 or larger sheets or rolls of media, where the medium is larger in width than the width of an individual scanner device. In this manner, overlapping lanes of scanner devices may include additional media support by bias members and, for example, may improve the chance of an accurate image capture.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the terms "about" or "substantially" are used herein to represent within 10% of a condition to which the term is applied.

Figure 2:
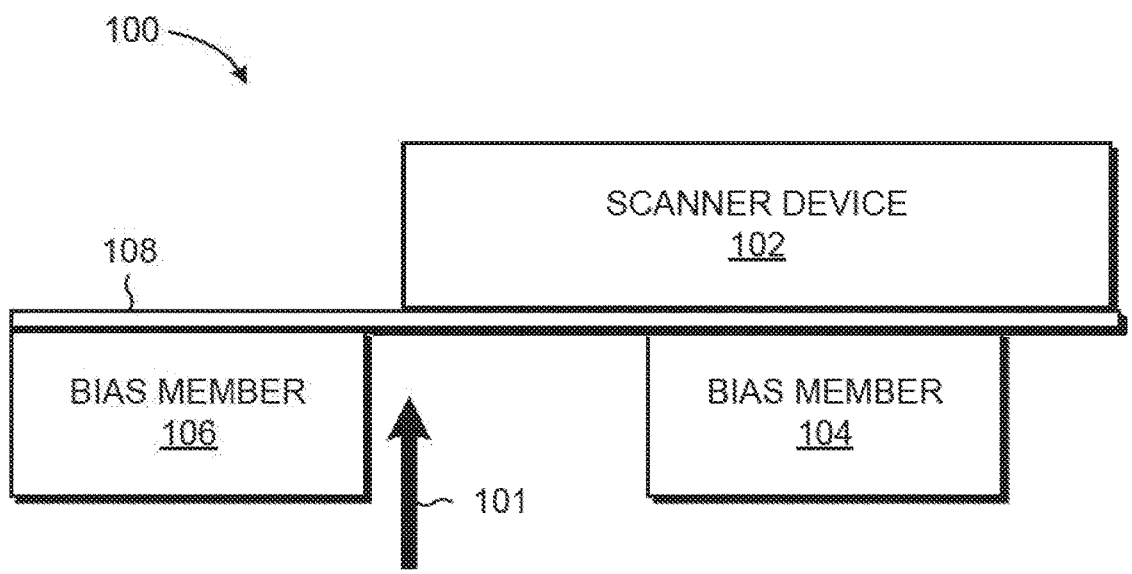
Figure 5:
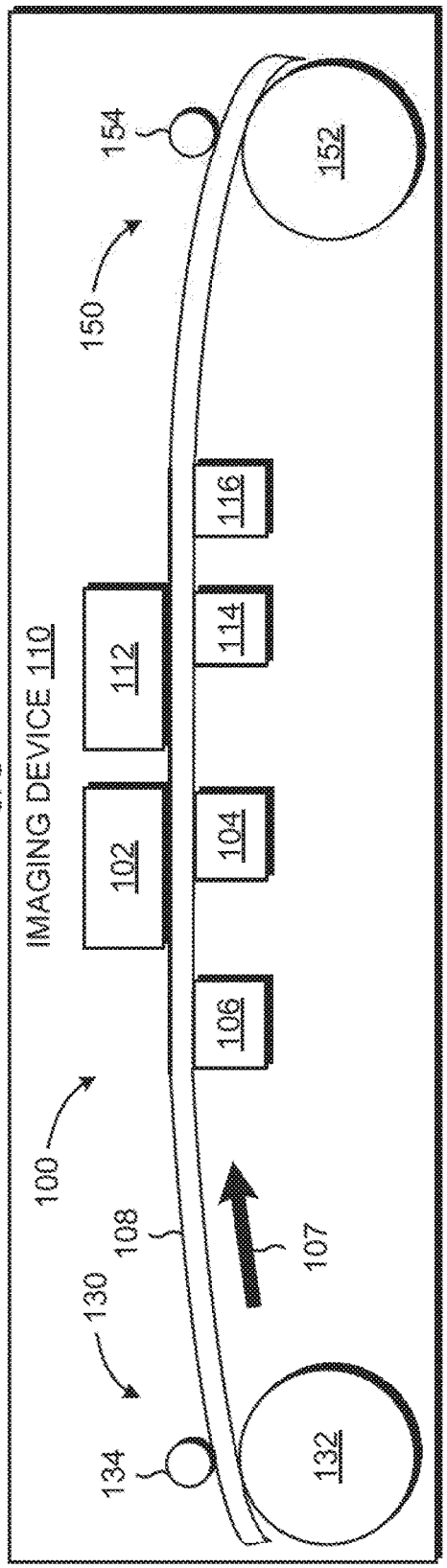
FIG. 5 is a side view block diagram of an example imaging device including an example scanning system.
Figure 6:
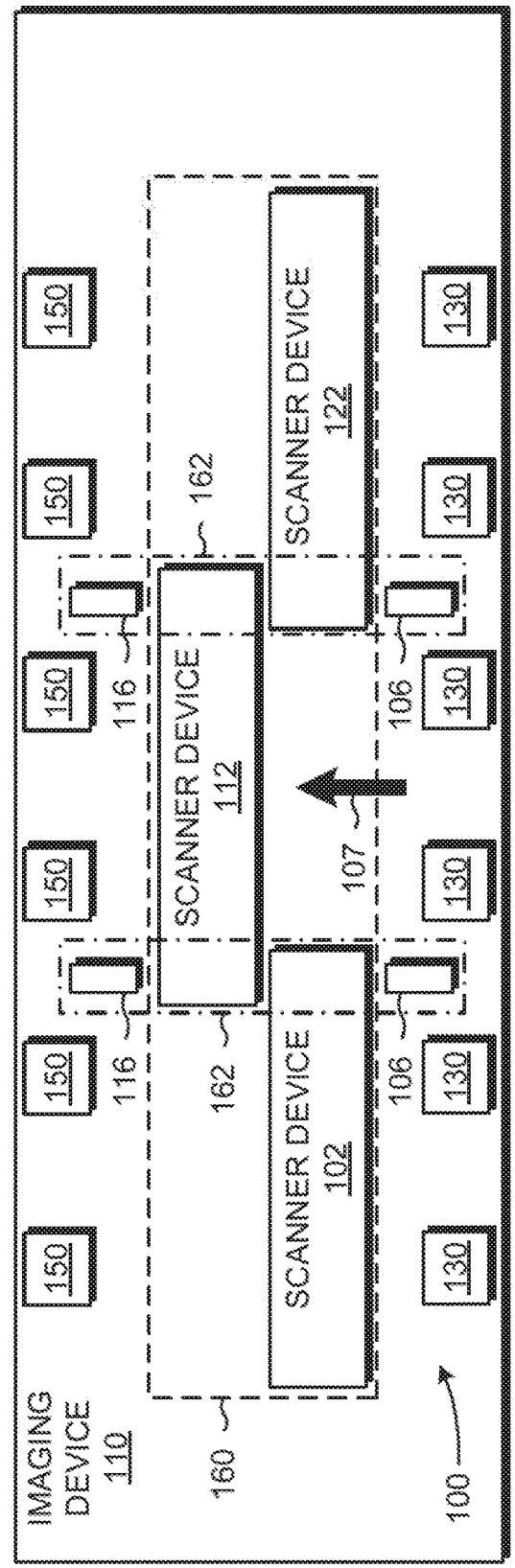
FIG. 6 is a top view block diagram of an example imaging device including an example scanning system.

FIGS. 1 and 2 are block diagrams depicting example scanning systems 100. Referring to FIG. 1, an example scanning system 100 generally includes a scanner device 102, a first bias member 104, and a second bias member 106. The scanner device 102 has a scan surface for performing a scan operation on medium 108. The bias member 104 is to apply pressure on media towards the scan surface at a scan zone (a zone defined by boundaries of the scanner device to allow for performing the scan operation). The bias member 104 may, for example, attempt to place a medium 108 against the scan surface of the scanner device 102. However, a lift force may be generated that places the medium 108 away from the scan surface based on the condition of the medium 108 before the medium 108 reaches the bias member 104. The bias member 106 may counter such a lifting effect, for example, by orienting the medium towards the scan surface before the medium 108 reaches the bias member 104. In the example of FIGS. 1 and 2, the bias member 106 is located so that the force of the bias member orients the medium before entering the scan zone. In the examples of FIGS. 5 and 6, a bias member may be located so that the force of the bias member orients the medium after exiting the scan zone. In other example, the bias member 106 may be partially located within the scan zone.

Referring to FIG. 2, the bias member 106 is biased to place a force in the direction 101 on the medium 108 towards the scanning surface. For example, the bias member 106 may align the location of the medium 108 to be oriented to be about the plane of the scan surface and/or the degree of bias of the bias member 104. For another example, the medium 108 may be placed in a substantially straight trajectory (e.g., a location level with the scan surface) before being operated on by the bias member 104. By placing the medium substantially at the plane of the scan surface, the lift effect on the medium 108 at or after the bias member 104 may be, for example, reduced and/or eliminated.

Figure 3:
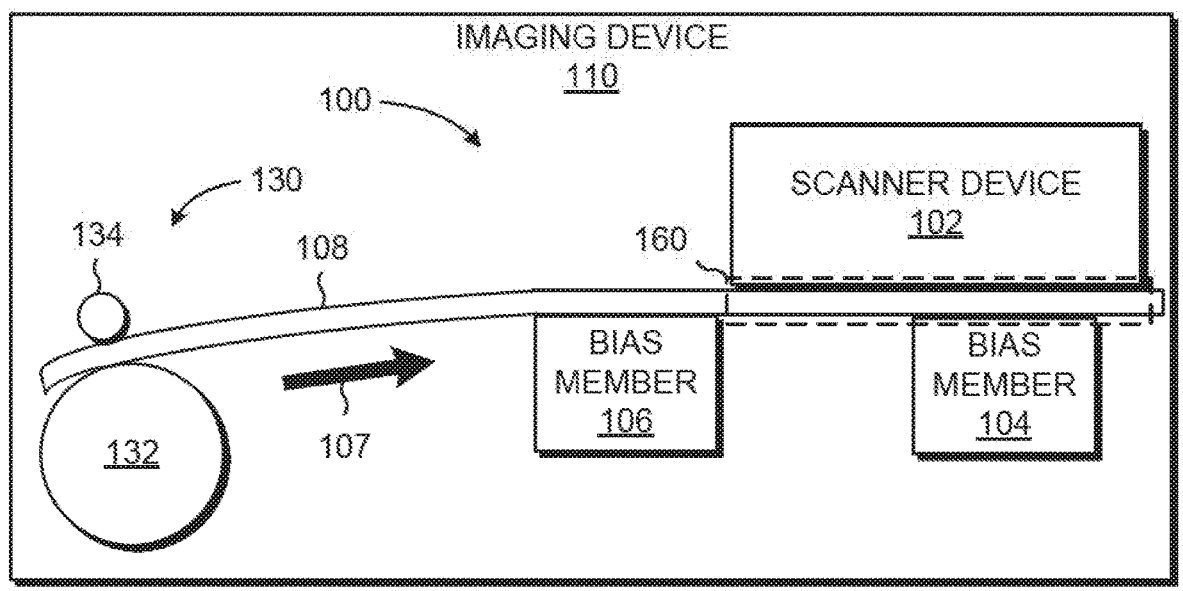
FIG. 3 is a block diagram depicting an example imaging device including an example scanning system.

FIG. 3 is a block diagram depicting an example imaging device 110 including an example scanning system 100. The example scanning system 100 includes a scanner device 102 and bias members 104 and 106, and the imaging device 110 includes an input drive mechanism 130 to move medium 108 to the scanner device 102. The bias member 106 is located along the media path to orient the medium 108 between the input drive mechanism 130 and the scan zone 160 in a direction towards the scanner device 102. The scan zone 160 may be defined by the area of the scan surface of the scanner device 102 (e.g., x and y boundaries) and between the bias member 104 across from the scan surface of the scanner device 102 (e.g., z boundary).

In the example of FIG. 3, the scanner device 102 may include a sensor that scans at a scan surface of the scanner device 102 and the imaging device 110 includes an input mechanism 130 to receive the medium 108 bearing an image to be scanned by the sensor. In other examples, such as FIGS. 5 and 6, the imaging device 110 may include an output mechanism (e.g., output mechanism 150 of FIG. 5) for outputting the medium 108 once the scan is completed.

The sensor of the scanner device 102 includes elements (such as optical elements) for scanning an image of the medium 108 at a scan surface of the scanner device 102. Example sensors of the scanner device 102 include a charge coupled device (CCD) sensor or a contact image sensor (CIS). For example, when implementing the scanner device 102 with a CIS sensor the medium 108 and the sensor may be located on the scan surface and the sensor may be in contact with the medium 108. The contact may be established via the bias member 104.

The input drive mechanism 130 may include components to move medium 108 to and/or from the scanner device 102. As shown in FIG. 3, the input drive mechanism 130 includes an input drive roller 132 to drive the medium in the media transport direction 107 and an input pinch wheel 134 to hold the medium against the input drive roller 132. The input pinch wheel 134 may provide a bias force in a direction away from the scan surface of the scanner device 102, for example, to maintain the medium 108 against the input drive roller 132 at the input pinch point (e.g., the point located between the input drive roller and the input pinch wheel).

In the example of FIG. 3, the input drive mechanism (e.g., the input pinch roller) acts as an offsetting member to cause a medium to become offset from the scan surface (e.g., the input pinch wheel 134 may have a bias away from the scan surface and the input drive roller 132 pushed the medium 108 along the media path in a manner that may create a lift effect at the scan surface.) An offsetting member may be any component of the imaging device 110 that exhibits a force on the medium 108 that may discourage or hinder the medium 108 from sliding flush against the scan surface of the scanner device, such as a paper guide that assists the medium to move in a direction oblique to the scan surface. The bias member 106 may be able to counter the effect of an offsetting member by placing the bias member 106 along the media path in between the offsetting member and the scan zone 160, thus modifying the effects of the offsetting member by using the bias force, shape, surface texture, and/or orientation (e.g., position) of the bias member 106.

Figure 4:
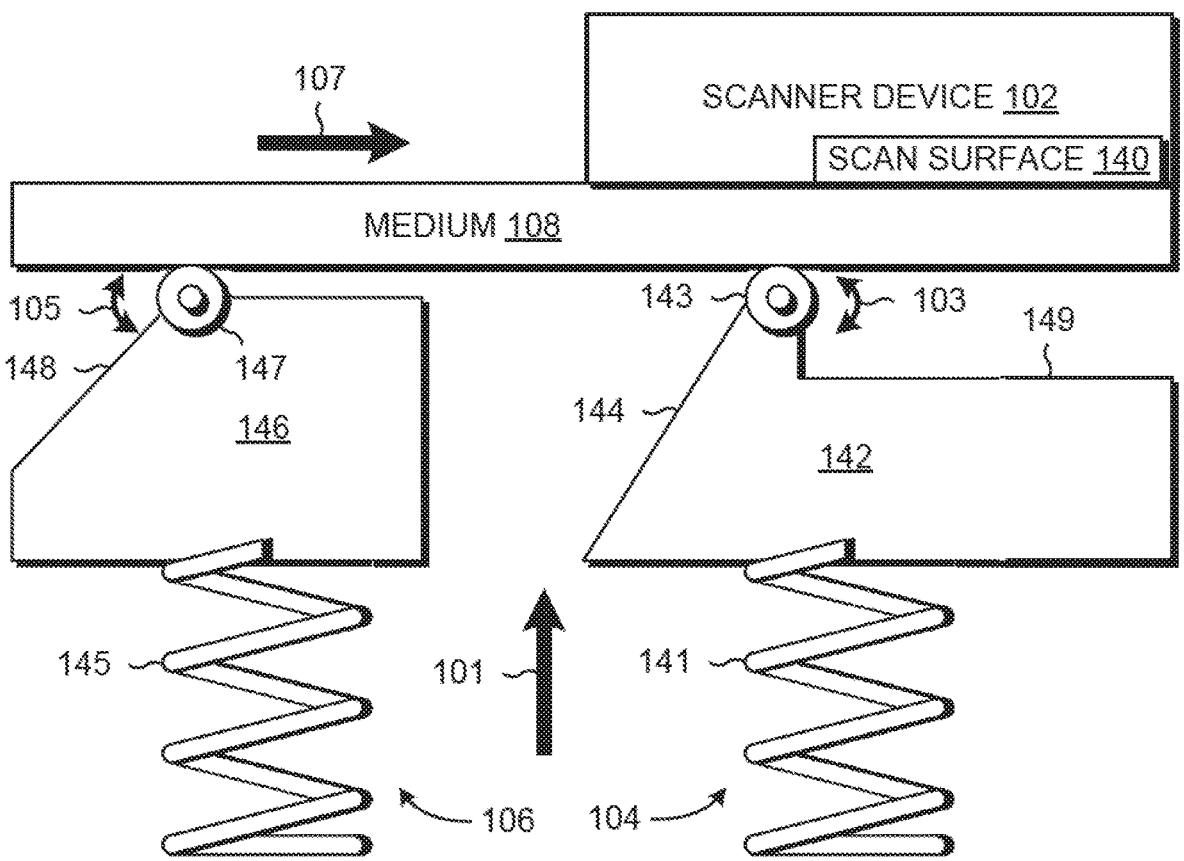
FIG. 4 depicts example bias members usable with an example scanning system.

FIG. 4 depicts example bias members 104 and 106 usable with an example scanning system 100. The bias members 104 and 106 may be used to guide the medium 108 towards the scan surface 140. For example, the bias member 104 may push the medium 108 against the beginning of the scan surface 140 and the bias member 106 may guide the medium 108 substantially towards about the horizontal plane of the scan surface 140 and/or receiving area of the bias member 104. The bias member 104 includes a compression member 141 (such as a spring) to provide a force in the direction 101, a body member 142 having a shape to facilitate movement of the medium 108 along a media path, and an idle roller 143 that is able to rotate in the direction 103 to allow, for example, a relatively smooth transition of the medium 108 while passing the bias member 104. The shape of the body member 142 may include a sloped surface 144 to contact the medium 108. For example, the body member 142 may be shaped to guide an edge of medium to the idle roller 143 and towards the scan surface 140 of the scanner device 102. The compression member 141 may provide a bias force on the body member 142 to bias the sloped surface towards the scan surface 140 (e.g., to guide the medium 108 to about the same horizontal plane as the scan surface 140).

The bias member 106 of FIG. 4 includes components similar to bias member 104 and the descriptions of elements 103, 141, 142, 143, and 144 are applicable to the rotation direction 105, the compression member 145, the body member 146, the idle roller 147, and the sloped surface 148 of the body member 146, respectively. As represented in FIG. 4, bias member 104 and bias member 106 may have different shapes. For example, the slope of the edge-facing surface 144 of the body member 142 may be have a greater incline than the slope of the edge-facing surface 148 of the body member 146. For another example, the idle roller 143 may be placed forward on the top surface of the body member 146 and the idle roller 143 may be placed about atop a pinch point of the body member 142 to allow a plateau surface 149 to act as a calibration surface for calibrating a sensor at the scan surface 140 of the scanner device 102.

The bias member 104 may be a calibration member used by the scanner device 102 to calibrate, for example, the sensors of the scanner device 102 to generate accurate image scanning operations. The scan zone may be bounded between the calibration member and the scan surface 140. The calibration member may include components, structure, and/or properties to apply pressure on media towards the scan surface within a scan zone as well as appropriate components, structure, and/or properties to perform a calibration operation. For example, the body member 142 may have a shape to include a protrusion extending from a base surface (e.g., surface 149) where the protrusion is to contact media and the base surface with a white color and generally flat (e.g., substantially parallel with respect to the scan surface 140) for white level calibration. For another example, the calibration member may be useable to calibrate image capture of the scanner device 102, slidable with reference to a media transport direction 107 to compensate for tension in the medium 108, and located such that a pinch surface of the calibration member (e.g., idle roller 143) is positioned before a position of the scan surface 140 of the scanner device 102 with respect to the media transport direction 107 so that the pinch point is, for example, less likely to interfere with a scanning operation using the scan surface 140. For example, the scan surface 140 may be located at the latter half or latter third of the scanner device and the idle roller 143 may be located under the former half or former third of the scanner device 102.

FIG. 5 is a side view block diagram of an example imaging device 110 including an example scanning system 100. The scanning system 100 includes a plurality of scanner devices 102 and 112 and a plurality of bias members 104, 106, 114, and 116. The bias members 104 and 114 are within the scan zone (e.g., underneath the scanner devices 102 and 112) to assist the medium 108 to contact the scan surfaces of the scanner devices 102 and 112. The bias members 106 and 116 are outside the scan zone to guide the medium 108 towards the bias member 104 (and the scanner device 102) and away from the bias member 114 (and the scanner device 112). The plurality of bias members 106 and 116 assist the medium 108 while entering and exiting the scan zone such that the medium 108 may be substantially within a threshold angle or threshold distance with respect to the scanning surfaces of scanner device 102 and 112.

The imaging device of FIG. 5 includes an input drive mechanism 130 and an output drive mechanism 150 to drive media through the imaging device 110. When located between the input and output mechanisms 130 and 150 and when a motor is active to drive the input mechanism 130 (and/or the output mechanism 150), the medium 108 is moved in a media transport direction 107 so as to pass the sensors of the scanner devices 102 and 112 which read an image from the medium 108 and provide data representing the image which may be used for further processing, for example to generate an electronic version of the image provided on the medium 108 or to provide data which may be used for forming a copy of the image by printing out the image using the data read by the sensor. In accordance with examples, the sensor of the scanner devices 102 may be a sensor reading the image while the medium 108 is continuously moved past the sensor. In accordance with other examples, the sensor of the scanner device 102 may be a sensor which reads the image from the medium 108 when the medium 108 is stopped beneath the sensor and, in such an example, the input mechanism may be driven by a stepper motor to intermittently drive the input mechanism 130.

The description of the input drive mechanism 130 with reference to FIG. 3 is applicable to the input drive mechanism 130 of FIGS. 5 and 6, and for brevity, the description is not repeated. The output drive mechanism 150 includes components similar to the input drive mechanism 130. The output drive mechanism 150 includes an output drive roller 152 to drive the medium 108 away from the scan zone and an output pinch wheel 154 to hold the medium 108 against the output drive roller 152 at the output pinch point (e.g., the point located between the output drive roller and the output pinch wheel). The output pinch roller 154 may have a bias in a direction away from the scan surface of the scanner device 112, for example. The scan surfaces of the scanner devices 102 and 112 may be on a horizontal plane that is offset from another horizontal plane associated with the input pinch point and the output pinch point. The bias members 106 and 116 may contact the medium between the drive mechanisms 130 and 150 and the scanner devices 102 and 112. For example, the bias members 106 and 116 may contact the medium 108 at a third horizontal plane between a first horizontal plane of the scanner devices surfaces and a second horizontal plane across by the input pinch point and the output pinch point.

In the example of FIG. 5, the input mechanism 130 and the output mechanism 150 are on opposite sides of the scanning system 100. However, in accordance with other examples, the input mechanism 130 and the output mechanism 150 may be on the same side of the scanning system 100 so as to allow feeding the medium 108 to be scanned and retrieving the scanned medium from the same side.

FIG. 6 is a top view block diagram of an example imaging device 110 including an example scanning system 100. The example scanning system 100 of FIG. 6 includes a plurality of scanner devices (e.g., scanner devices 102, 112, and 122). The plurality of scanner devices may overlap with respect to the cross-section (e.g., width) of a medium traveling along the media path in the media transport direction 107. For example, the scanning system 100 may include a first scanner device 102 that is able to scan a first area of media that partially overlaps a second area of media scannable by a second scanner device 112 and a third scanner device 122 that is able to scan a third area of media that partially overlaps the second area of media scannable by the second scanner device 112 so that there is an ability to scan across a media width that is larger than the scannable area of a single scanner device. In the example of FIG. 6, the scan zone 160 includes the area bounded by the positions and sizes of the scanner devices 102, 112, and 122 and the overlapping areas 162 include areas bounded by the scannable areas of the scanners where multiple scanner devices are able to scan the same area with respect to the x position across the medium as the medium passes along the media path through the scan zone 160.

The imaging device 110 of FIG. 6 includes a plurality of input bias members 106 and a plurality of output bias member 116. The bias members 106 and 116 may be located outside of the scan zone 160 and within the overlap areas 162 along a media transport direction 107 and bounded by an area of overlap between scanner devices. For example, a plurality of input bias members 106 may arranged so that a first input bias member 106 is within a first overlap zone 162 along a media transport direction 107 and between the scanner device 102 and the scanner device 112 and a second input bias member 106 is within a second overlap zone 162 along the media transport direction 107 and between the scanner device 112 and 122. Other bias members (not shown) may be located underneath the scanner devices 102, 112, and 122 to orient media along the media path to pass along the surface of the scanner devices 102, 112, and 122.

The imaging device 110 of FIG. 6 includes a plurality of input drive mechanisms 130 (e.g., a plurality of input drive rollers 132 of FIG. 5) and a plurality of output drive mechanisms 150 (e.g., a plurality of output drive rollers 152 of FIG. 5). The medium 108 may pass along a media path defined between the plurality of input drive mechanisms 130 and the plurality of output drive mechanisms 150. The plurality of bias members may define the media path between the plurality of input drive mechanisms 130 and the output drive mechanism 150. For example, the scanning system 100 of FIG. 6 may include an arrangement of a plurality of input bias members 106 and a plurality of output bias members 116 such that the bias members 106 orient the media path between the plurality of input drive rollers and the plurality of scanner devices and the plurality of output bias members 116 orient the media path between the plurality of scanner devices and the plurality of output drive rollers.

The plurality of bias members 106 and 116 may assist media along the media path at the overlap zones of the scanner devices. For example, the plurality of input bias members may include a first input bias member 106 located within a first zone 162 along a media transport direction 107 bounded by a first area of overlap between a first scanner device 102 and a second scanner device 112 and a second input bias member 106 located within a second zone 162 along the media transport direction 107 bounded by a second area of overlap between the second scanner device 112 and a third scanner device 122. For another example, a plurality of output bias members may include a first output bias member 116 located within a first zone 162 along a media transport direction 107 bounded by a first area of overlap between the first scanner device 102 and a second scanner device 112 and a second output bias member 116 located within a second zone 162 along the media transport direction 107 bounded by a second area of overlap between the second scanner device 112 and the third scanner device 122. In other examples, an input bias member and output bias member pair may be included in each overlap zone of the scanner devices.

By placing bias members before and/or after the scanner devices, media passing through the scanning system 100 may, for example, be maintained at about a level of the scan surfaces of the scanning devices and digitized images of media scanned by a plurality of scanner devices may, for example, be accurately stitched together when the bias members are placed to support the media in the overlapping scanner devices areas as described herein.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A scanning system comprising:
   a scanner device having a scan surface;
   a first bias member to apply pressure on a medium in a first direction towards the scan surface at a scan zone, the scan zone defined by boundaries of the scanner device; and
   a second bias member to apply pressure to the medium in the first direction towards the scan surface at a point before the medium reaches the first bias member.

2. The system of claim 1, wherein the second bias member biases the medium before entering the scan zone.

3. The system of claim 1, wherein the second bias member applies pressure on the medium outside of the scan zone to place the medium against the scan surface when in the scan zone.

4. The system of claim 1, wherein the second bias member orients the medium to about a plane of the scan surface.

5. The system of claim 1, wherein:
   the first bias member comprises:
   a first sloped surface to contact the medium; and
   a first spring to bias the first sloped surface towards the scan surface; and
   the second bias member comprises;
   a second sloped surface to contact the medium;
   an idle roller at an end of the second sloped surface; and
   a second spring to bias the idle roller to guide the medium towards the scan surface.

6. The system of claim 1, the first and second bias members each having a sloped surface oriented toward a leading edge of media in a media path, wherein the sloped surface of the first bias member has a greater incline that the sloped surface of the second bias member.

7. The system of claim 1, wherein the first bias member comprises a calibration surface adjacent the scan zone of the scanner device.

8. The system of claim 7, wherein the calibration surface is a white surface.

9. The device of claim 1, wherein the scanner device comprises multiple individual scanners, the multiple scanners having respective scan zones that overlap with respect to movement of media in a media path.

10. A printing device comprising:
    a scanner device having a scan surface, the scan surface defining a plane at which a document is placed to be scanned by the scanner device;
    an input drive mechanism to move a medium to the scanner device;
    a calibration member to apply pressure on the medium towards the scan surface within a scan zone, the scan zone located between the scan surface and the calibration member; and
    a biased member to apply pressure to the medium at a point between the input drive mechanism and the scan zone, the biased member to apply pressure to the medium in a direction that is into the plane of the scan surface of the scanner device.

11. The device of claim 10, wherein the printing device comprises:
    an offsetting member to cause the medium to become offset from the scan surface,
    wherein the bias member is located along a media path between the offsetting member and the scan zone.

12. The device of claim 10, further comprising an output drive mechanism comprising:
    an output drive roller to drive the medium; and
    an output pinch wheel to hold the medium against the output drive roller,
    wherein:
    the input drive mechanism comprises an input drive roller to drive the medium and an input pinch wheel to hold the medium against the input drive roller;
    an input pinch point is located between the input drive roller and the input pinch wheel;
    an output pinch point is located between the output drive roller and the output pinch wheel;
    the scan surface is on a first horizontal plane offset from a second horizontal plane associated with the input pinch point and the output pinch point; and
    the bias member contacts the medium at a third horizontal plane between the first horizontal plane and the second horizontal plane.

13. The device of claim 12, wherein:
    the input pinch wheel has a first bias in a direction away from the scan surface;
    the output pinch wheel has a second bias in a direction away from the scan surface.

14. The device of claim 10, wherein the calibration member is:
    slidable with reference to a media transport direction;
    useable to calibrate image capture of the scanner device; and
    located such that a pinch surface of the calibration member is positioned before a position of the scan surface of the scanner device with respect to the media transport direction.

15. An imaging device comprising:
    a plurality of input drive rollers;
    a plurality of output drive rollers,
    a media path defined between the plurality of output drive rollers and the plurality of input drive rollers;
    a plurality of scan devices, the scan devices having respective scan zones that overlap in a direction along which media moves in the media path; and
    a plurality of input bias members to bias media in the media path between the plurality of input drive rollers and the plurality of scan devices;
    wherein the bias members are aligned in a direction of the media path with overlapping portions of the scan devices.

16. The device of claim 15, wherein:
    the plurality of scan devices includes a first scan device, a second scan device, a and a third scan device;
    the first scan device overlaps the second scan device across the media path; and the second scan device overlaps the third scan device across the media path.

17. The device of claim 16, wherein:

the plurality of input bias members includes a first input bias member and a second input bias member;

the first input bias member is located within a first zone along a media transport direction bounded by a first area of overlap between the first scan device and the second scan device; and the second input bias member is located within a second zone along the media transport direction bounded by a second area of overlap between the second scan device and the third scan device.

18. The device of claim 15, further comprising:

a plurality of output bias members to bias media in the media path between the plurality of scan devices and the plurality of output drive rollers.

19. The device of claim 18, wherein:

the plurality of output bias members includes a first output bias member and a second output bias member;

the first output bias member is located within a first zone along a media transport direction bounded by a first area of overlap between the scan zones of the first scan device and the second scan device; and the second output bias member is located within a second zone along the media transport direction bounded by a second area of overlap between the scan zones of second scan device and the third scan device.

* * * * *